US010337332B2

(12) United States Patent
Auxier et al.

(10) Patent No.: US 10,337,332 B2
(45) Date of Patent: Jul. 2, 2019

(54) AIRFOIL HAVING PEDESTALS IN TRAILING EDGE CAVITY

(71) Applicant: United Technologies Corporation, Farmington, CT (US)

(72) Inventors: James Tilsley Auxier, Bloomfield, CT (US); Bret M. Teller, Meriden, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 734 days.

(21) Appl. No.: 15/053,682

(22) Filed: Feb. 25, 2016

(65) Prior Publication Data
US 2017/0248021 A1   Aug. 31, 2017

(51) Int. Cl.
*F01D 5/18* (2006.01)
*F01D 11/08* (2006.01)
(Continued)

(52) U.S. Cl.
CPC ............ *F01D 5/187* (2013.01); *F01D 9/041* (2013.01); *F01D 11/08* (2013.01); *F01D 25/12* (2013.01); *B22C 9/101* (2013.01); *F05D 2220/32* (2013.01); *F05D 2230/20* (2013.01); *F05D 2230/211* (2013.01); *F05D 2240/122* (2013.01);
(Continued)

(58) Field of Classification Search
CPC ... F05D 2260/22141; F05D 2260/2212; F05D 2220/32; F05D 2230/20; F05D 2240/122; F05D 2240/304; F05D 2240/55; F05D 2260/2214; Y02T 50/676; Y02T 50/673; F01D 5/187; F01D 9/041; F01D 11/08; F01D 25/12; B22C 9/101
See application file for complete search history.

(56) References Cited

U.S. PATENT DOCUMENTS 5,337,805 A * 8/1994 Green .................. F01D 5/187
164/122.1
5,462,405 A * 10/1995 Hoff ..................... F01D 5/187
415/115

(Continued)

FOREIGN PATENT DOCUMENTS

EP        2713012          4/2014
WO   2013142460 A1      9/2013

OTHER PUBLICATIONS

European Search Report, European Application No. 17158004.6, dated Jul. 4, 2017, European Patent Office; European Search Report 9 pages.

*Primary Examiner* — Carlos A Rivera
*Assistant Examiner* — Eric J Zamora Alvarez
(74) *Attorney, Agent, or Firm* — Cantor Colburn LLP

(57) ABSTRACT

An airfoil of a gas turbine engine includes an airfoil body having a leading edge and a trailing edge extending in a radial direction, a trailing edge cavity formed within the airfoil and proximate to the trailing edge of the airfoil, the trailing edge cavity extending from the trailing edge in a forward direction toward the leading edge, at least one set of blocking pedestals located within the trailing edge cavity, a set of circular pedestals located aftward from the at least one blocking set of pedestals, and a set of spear pedestals located aftward from the set of circular pedestals and closest to the trailing edge of the airfoil body.

19 Claims, 8 Drawing Sheets

(51) Int. Cl.
    *F01D 25/12*           (2006.01)
    *F01D 9/04*            (2006.01)
    *B22C 9/10*            (2006.01)

(52) U.S. Cl.
    CPC .... *F05D 2240/304* (2013.01); *F05D 2240/55* (2013.01); *F05D 2260/2214* (2013.01); *F05D 2260/22141* (2013.01); *Y02T 50/676* (2013.01)

(56) References Cited

U.S. PATENT DOCUMENTS

| | | | | |
|---|---|---|---|---|
| 5,931,638 | A * | 8/1999 | Krause | F01D 5/186 |
| | | | | 415/115 |
| 6,234,754 | B1 | 5/2001 | Zelesky et al. | |
| 6,929,451 | B2 * | 8/2005 | Gregg | F01D 5/16 |
| | | | | 416/500 |
| 7,014,424 | B2 * | 3/2006 | Cunha | B22C 9/103 |
| | | | | 415/115 |
| 7,021,893 | B2 * | 4/2006 | Mongillo, Jr. | F01D 5/187 |
| | | | | 415/115 |
| 7,033,140 | B2 * | 4/2006 | Gregg | F01D 5/16 |
| | | | | 416/135 |
| 7,156,620 | B2 * | 1/2007 | Papple | F01D 5/187 |
| | | | | 415/115 |
| 7,438,527 | B2 * | 10/2008 | Albert | B22C 9/04 |
| | | | | 416/90 R |
| 7,478,994 | B2 * | 1/2009 | Cunha | F01D 5/18 |
| | | | | 415/115 |
| 2008/0181774 | A1 | 7/2008 | Cunha | |

* cited by examiner

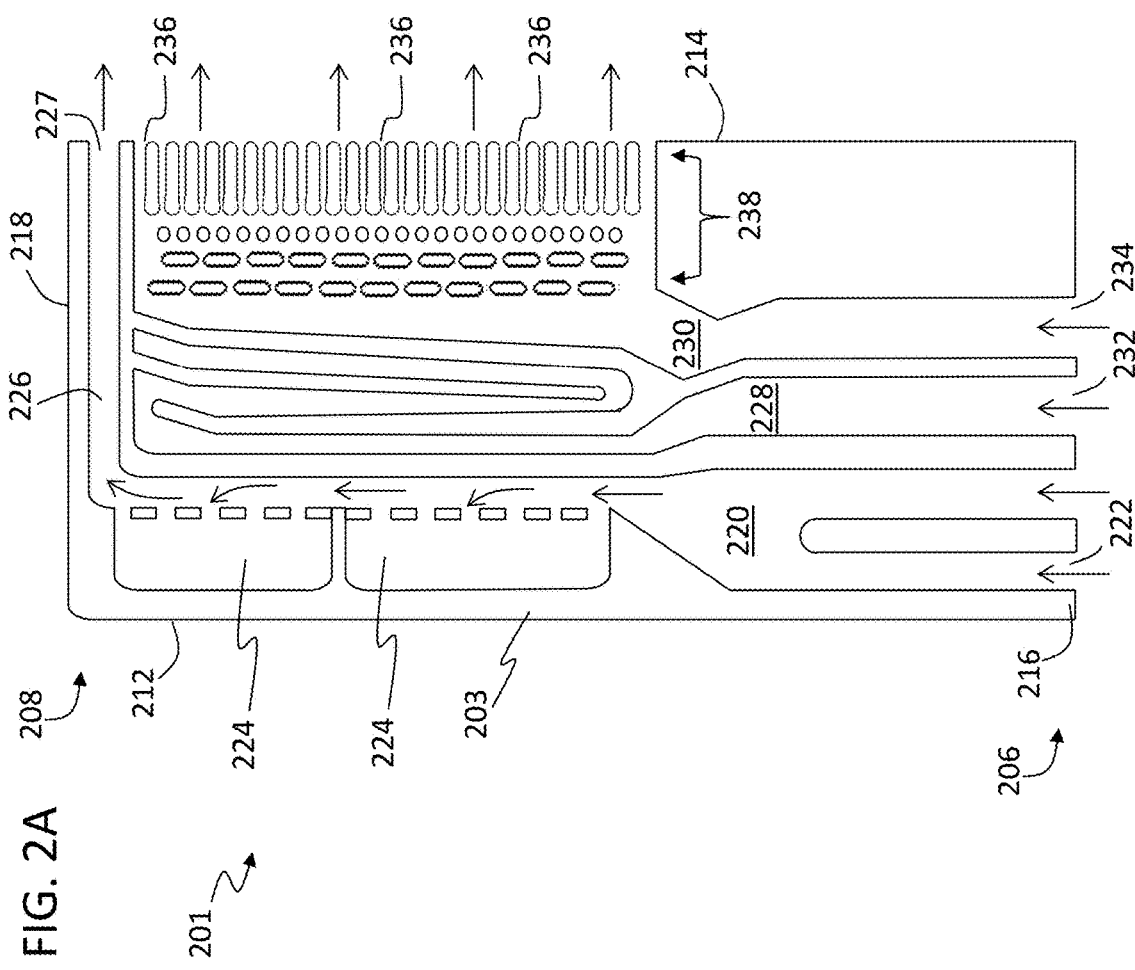

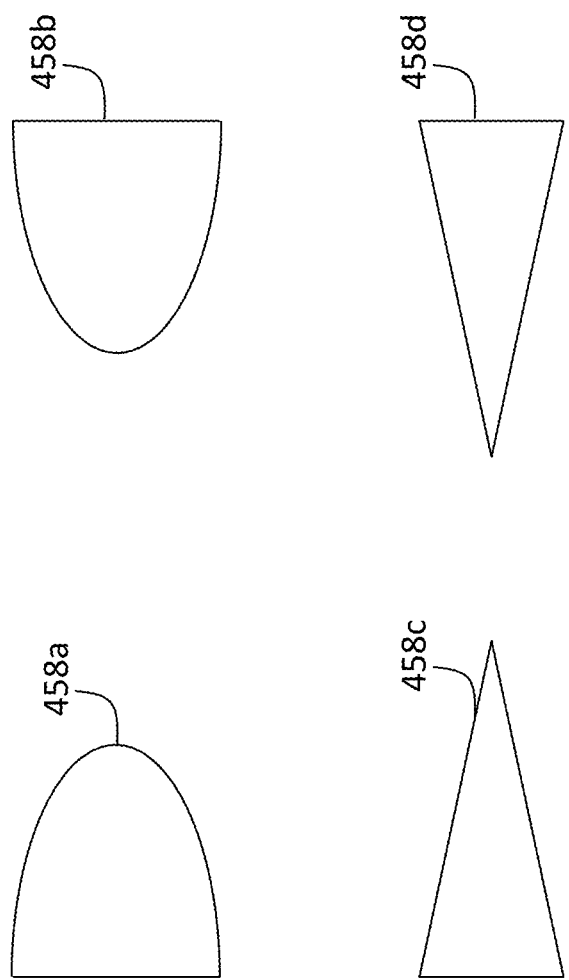

AIRFOIL HAVING PEDESTALS IN TRAILING EDGE CAVITY

BACKGROUND

The subject matter disclosed herein generally relates to airflow in components of gas turbine engines and, more particularly, to pedestals in a trailing edge cavity of an airfoil in components of gas turbine engines.

Airfoils, and particularly airfoils of gas turbine engines, may include internal flow passages to enable cooling of the airfoils. At various points on the airfoil, air may be bled from and/or between the internal flow passages. In gas turbine engines, one way to improve efficiency is by increasing the pressure and temperature of the compressed and combusted air, from which the turbine extracts work. Thus more highly-evolved turbines see ever-increasing gaspath and cooling air temperatures, which presents a challenge as the gaspath temperatures often exceed incipient melting temperatures of the constituent alloys of the airfoils. Complex internal cooling schemes may be configured to supply convective cooling and source film cooling. The airfoils may be produced by investment casting of superalloys with ceramic cores.

The supply of the cooling air through cavities of the airfoils may be carefully designed so as to provide an efficient cooling configuration. As the amount of cooling air required to cool greater heat loads increases, the areas through which the cooling air must pass to serve its function do not necessarily proportionally increase. This presents an issue as there are deleterious effects associated with increasing the Mach number through the internal cavities of the airfoil. A common "pinch point" where a cavity Mach number may increase above an acceptable level is in the neck of an airfoil near the radial level of the platform, affecting typically leading-edge and trailing-edge feeds.

At the same time, with ever-increasing demands on fuel-efficiency and performance, combustor exit temperatures have steadily been increasing while the availability of compressor bleed cooling air has been decreasing. As such, airfoils may be cast with an RMC (refractory metal core) trailing edge in order to provide augmented heat transfer simultaneously with improved performance by efficiently improving conductive cooling effects with an extremely thin core cross-section. Improvements thereon are desirable.

SUMMARY

According to one embodiment, an airfoil of a gas turbine engine is provided having an airfoil body having a leading edge and a trailing edge extending in a radial direction, a trailing edge cavity formed within the airfoil and proximate to the trailing edge of the airfoil, the trailing edge cavity extending from the trailing edge in a forward direction toward the leading edge, at least one set of blocking pedestals located within the trailing edge cavity, a set of circular pedestals located aftward from the at least one set of blocking pedestals, and a set of spear pedestals located aftward from the set of circular pedestals and closest to the trailing edge of the airfoil body.

In addition to one or more of the features described above, or as an alternative, further embodiments of the airfoil may include that the at least one set of blocking pedestals comprises two sets of blocking pedestals.

In addition to one or more of the features described above, or as an alternative, further embodiments of the airfoil may include that a spacing between a first set of blocking pedestals and a second set of blocking pedestals is between 0.025 inches and 0.100 inches (0.064-0.254 cm) and a space between the second set of blocking pedestals and the set of circular pedestals is between 0.025 inches and 0.100 inches (0.064-0.254 cm).

In addition to one or more of the features described above, or as an alternative, further embodiments of the airfoil may include that each of the at least one set of blocking pedestals, the set of circular pedestals, and the set of spear pedestals are arranged along a respective pedestal axis extending in a radial direction, wherein each pedestal axis is parallel with the other pedestal axes.

In addition to one or more of the features described above, or as an alternative, further embodiments of the airfoil may include that each pedestal of the at least one set of blocking pedestals has a length extending in an axial direction and a width in the radial direction, wherein the width is greater than the length.

In addition to one or more of the features described above, or as an alternative, further embodiments of the airfoil may include that a width to length ratio for the pedestals of the at least one set of blocking pedestals is between 0.75 and 0.90.

In addition to one or more of the features described above, or as an alternative, further embodiments of the airfoil may include that the length of each pedestal of the at least one set of blocking pedestals is between 0.036 inches and 0.144 inches (0.091-0.366 cm) and the width of each pedestal of the at least one set of blocking pedestals is between 0.013 inches and 0.050 inches (0.033-0.127 cm).

In addition to one or more of the features described above, or as an alternative, further embodiments of the airfoil may include that each pedestal of the at least one set of blocking pedestals has a racetrack geometry.

According to another embodiment, a gas turbine engine is provided including an airfoil having an airfoil body having a leading edge and a trailing edge extending in a radial direction, a trailing edge cavity formed within the airfoil and proximate to the trailing edge of the airfoil, the trailing edge cavity extending from the trailing edge in a forward direction toward the leading edge, at least one set of blocking pedestals located within the trailing edge cavity, a set of circular pedestals located aftward from the at least one set of blocking pedestals, and a set of spear pedestals located aftward from the set of circular pedestals and closest to the trailing edge of the airfoil body.

In addition to one or more of the features described above, or as an alternative, further embodiments of the gas turbine engine may include that the at least one set of blocking pedestals comprises two sets of blocking pedestals.

In addition to one or more of the features described above, or as an alternative, further embodiments of the gas turbine engine may include that a spacing between a first set of blocking pedestals and a second set of blocking pedestals is between 0.025 inches and 0.100 inches (0.064-0.254 cm) and a space between the second set of blocking pedestals and the set of circular pedestals is between 0.025 inches and 0.100 inches (0.064-0.254 cm)

In addition to one or more of the features described above, or as an alternative, further embodiments of the gas turbine engine may include that each of the at least one set of blocking pedestals, the set of circular pedestals, and the set of spear pedestals are arranged along a respective pedestal axis extending in a radial direction, wherein each pedestal axis is parallel with the other pedestal axes.

In addition to one or more of the features described above, or as an alternative, further embodiments of the gas turbine engine may include that each pedestal of the at least one set of blocking pedestals has a length extending in an axial direction and a width in the radial direction, wherein the width is greater than the length.

In addition to one or more of the features described above, or as an alternative, further embodiments of the gas turbine engine may include that a width to length ratio for the pedestals of the at least one set of blocking pedestals is between 0.75 and 0.90.

In addition to one or more of the features described above, or as an alternative, further embodiments of the gas turbine engine may include that the length of each pedestal of the at least one set of blocking pedestals is between 0.036 inches and 0.144 inches (0.091-0.366 cm) and the width of each pedestal of the at least one set of blocking pedestals is between 0.013 inches and 0.050 inches (0.033-0.127 cm).

In addition to one or more of the features described above, or as an alternative, further embodiments of the gas turbine engine may include that each pedestal of the at least one set of blocking pedestals has a racetrack geometry.

According to another embodiment, a method of manufacturing an airfoil of a gas turbine engine is provided. The method includes forming an airfoil body having a leading edge, a trailing edge, and a trailing edge cavity, the trailing edge cavity being located within the airfoil and proximate to the trailing edge, forming at least one set of blocking pedestals located within the trailing edge cavity, forming a set of circular pedestals located aftward toward the trailing edge from the at least one set of blocking pedestals, and forming a set of spear pedestals located aftward toward the trailing edge from the set of circular pedestals and closest to the trailing edge of the airfoil body.

In addition to one or more of the features described above, or as an alternative, further embodiments of the method may include that the at least one set of blocking pedestals comprises two sets of blocking pedestals.

In addition to one or more of the features described above, or as an alternative, further embodiments of the method may include that each of the at least one set of blocking pedestals, the set of circular pedestals, and the set of spear pedestals are formed along a respective pedestal axis extending in a radial direction, wherein each pedestal axis being parallel with the other pedestal axes.

In addition to one or more of the features described above, or as an alternative, further embodiments of the method may include that each pedestal of the at least one set of blocking pedestals has a length extending in an axial direction and a width in the radial direction, wherein the width is greater than the length.

According to another embodiment, a core for manufacturing an airfoil of a gas turbine engine is provided. The core includes a core body having core body and a plurality of apertures and voids therein configured to enable manufacture of an airfoil, the core body having a leading edge and a trailing edge extending in a radial direction and a trailing edge structure proximate to the trailing edge of the core body, the trailing edge structure configured to form a trailing edge cavity in an airfoil, the trailing edge structure extending from the trailing edge in a forward direction toward the leading edge. The trailing edge structure includes at least one first set of apertures configured to form at least one set of blocking pedestals located within the trailing edge cavity, at least one second set of apertures configured to form a set of circular pedestals located aftward from the at least one blocking set of pedestals, and at least one third set of apertures configured to form a set of spear pedestals located aftward from the set of circular pedestals and closest to the trailing edge of the airfoil body.

In addition to one or more of the features described above, or as an alternative, further embodiments of the core may include that the core body is a refractory metal core.

In addition to one or more of the features described above, or as an alternative, further embodiments of the core may include that the first set of apertures includes apertures for two sets of blocking pedestals.

In addition to one or more of the features described above, or as an alternative, further embodiments of the core may include that each of the first set of apertures, the second set of apertures, and the third set of apertures are arranged along a respective pedestal axis extending in a radial direction, wherein each pedestal axis is parallel with the other pedestal axes.

Technical effects of embodiments of the present disclosure include an airfoil having a radial-fed trailing edge with a bank of parallel rows of pedestals or other features including oblong pedestals, circular pedestals, and racetrack exits. Each row of pedestals may be integrally clocked with the next row, and may be sized and staggered to provide a balance between flow restrictions and even flow distribution.

The foregoing features and elements may be executed or utilized in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The subject matter is particularly pointed out and distinctly claimed at the conclusion of the specification. The foregoing and other features, and advantages of the present disclosure are apparent from the following detailed description taken in conjunction with the accompanying drawings in which:

FIG. 2A is a cross-sectional schematic illustration of an airfoil in accordance with an embodiment of the present disclosure;

FIG. 4 is a schematic illustration alternative configurations of pedestals in accordance with the present disclosure;

DETAILED DESCRIPTION

Figure 1A:
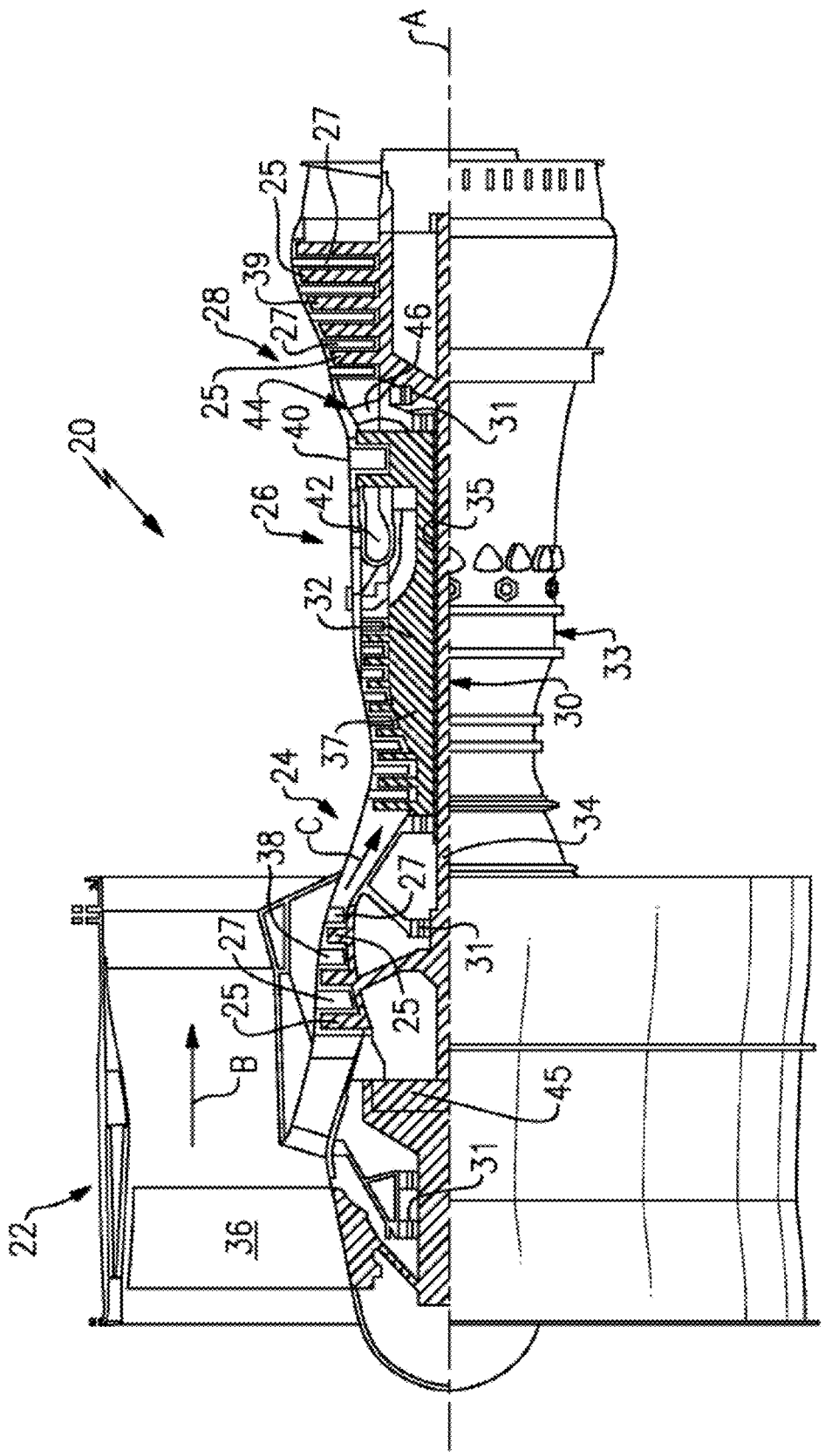
FIG. 1A is a schematic cross-sectional illustration of a gas turbine engine that may employ various embodiments disclosed herein.

As shown and described herein, various features of the disclosure will be presented. Various embodiments may have the same or similar features and thus the same or similar features may be labeled with the same reference numeral, but preceded by a different first number indicating the Figure Number to which the feature is shown. Thus, for example, element "a" that is shown in FIG. X may be labeled "Xa" and a similar feature in FIG. Z may be labeled "Za." Although similar reference numbers may be used in a generic sense, various embodiments will be described and various features may include changes, alterations, modifications, etc. as will be appreciated by those of skill in the art, whether explicitly described or otherwise would be appreciated by those of skill in the art.

FIG. 1A schematically illustrates a gas turbine engine 20. The exemplary gas turbine engine 20 is a two-spool turbofan engine that generally incorporates a fan section 22, a compressor section 24, a combustor section 26, and a turbine section 28. Alternative engines might include an augmenter section (not shown) among other systems for features. The fan section 22 drives air along a bypass flow path B, while the compressor section 24 drives air along a core flow path C for compression and communication into the combustor section 26. Hot combustion gases generated in the combustor section 26 are expanded through the turbine section 28. Although depicted as a turbofan gas turbine engine in the disclosed non-limiting embodiment, it should be understood that the concepts described herein are not limited to turbofan engines and these teachings could extend to other types of engines, including but not limited to, three-spool engine architectures.

The gas turbine engine 20 generally includes a low speed spool 30 and a high speed spool 32 mounted for rotation about an engine centerline longitudinal axis A. The low speed spool 30 and the high speed spool 32 may be mounted relative to an engine static structure 33 via several bearing systems 31. It should be understood that other bearing systems 31 may alternatively or additionally be provided.

The low speed spool 30 generally includes an inner shaft 34 that interconnects a fan 36, a low pressure compressor 38 and a low pressure turbine 39. The inner shaft 34 can be connected to the fan 36 through a geared architecture 45 to drive the fan 36 at a lower speed than the low speed spool 30. The high speed spool 32 includes an outer shaft 35 that interconnects a high pressure compressor 37 and a high pressure turbine 40. In this embodiment, the inner shaft 34 and the outer shaft 35 are supported at various axial locations by bearing systems 31 positioned within the engine static structure 33.

A combustor 42 is arranged between the high pressure compressor 37 and the high pressure turbine 40. A mid-turbine frame 44 may be arranged generally between the high pressure turbine 40 and the low pressure turbine 39. The mid-turbine frame 44 can support one or more bearing systems 31 of the turbine section 28. The mid-turbine frame 44 may include one or more airfoils 46 that extend within the core flow path C.

The inner shaft 34 and the outer shaft 35 are concentric and rotate via the bearing systems 31 about the engine centerline longitudinal axis A, which is co-linear with their longitudinal axes. The core airflow is compressed by the low pressure compressor 38 and the high pressure compressor 37, is mixed with fuel and burned in the combustor 42, and is then expanded over the high pressure turbine 40 and the low pressure turbine 39. The high pressure turbine 40 and the low pressure turbine 39 rotationally drive the respective high speed spool 32 and the low speed spool 30 in response to the expansion.

The pressure ratio of the low pressure turbine 39 can be pressure measured prior to the inlet of the low pressure turbine 39 as related to the pressure at the outlet of the low pressure turbine 39 and prior to an exhaust nozzle of the gas turbine engine 20. In one non-limiting embodiment, the bypass ratio of the gas turbine engine 20 is greater than about ten (10:1), the fan diameter is significantly larger than that of the low pressure compressor 38, and the low pressure turbine 39 has a pressure ratio that is greater than about five (5:1). It should be understood, however, that the above parameters are only examples of one embodiment of a geared architecture engine and that the present disclosure is applicable to other gas turbine engines, including direct drive turbofans.

In this embodiment of the example gas turbine engine 20, a significant amount of thrust is provided by the bypass flow path B due to the high bypass ratio. The fan section 22 of the gas turbine engine 20 is designed for a particular flight condition—typically cruise at about 0.8 Mach and about 35,000 feet. This flight condition, with the gas turbine engine 20 at its best fuel consumption, is also known as bucket cruise Thrust Specific Fuel Consumption (TSFC). TSFC is an industry standard parameter of fuel consumption per unit of thrust.

Fan Pressure Ratio is the pressure ratio across a blade of the fan section 22 without the use of a Fan Exit Guide Vane system. The low Fan Pressure Ratio according to one non-limiting embodiment of the example gas turbine engine 20 is less than 1.45. Low Corrected Fan Tip Speed is the actual fan tip speed divided by an industry standard temperature correction of $[(Tram\ °\ R)/(518.7°\ R)]^{0.5}$, where T represents the ambient temperature in degrees Rankine. The Low Corrected Fan Tip Speed according to one non-limiting embodiment of the example gas turbine engine 20 is less than about 1150 fps (351 m/s).

Each of the compressor section 24 and the turbine section 28 may include alternating rows of rotor assemblies and vane assemblies (shown schematically) that carry airfoils that extend into the core flow path C. For example, the rotor assemblies can carry a plurality of rotating blades 25, while each vane assembly can carry a plurality of vanes 27 that extend into the core flow path C. The blades 25 of the rotor assemblies create or extract energy (in the form of pressure) from the core airflow that is communicated through the gas turbine engine 20 along the core flow path C. The vanes 27 of the vane assemblies direct the core airflow to the blades 25 to either add or extract energy.

Various components of a gas turbine engine 20, including but not limited to the airfoils of the blades 25 and the vanes 27 of the compressor section 24 and the turbine section 28, may be subjected to repetitive thermal cycling under widely ranging temperatures and pressures. The hardware of the turbine section 28 is particularly subjected to relatively extreme operating conditions. Therefore, some components may require internal cooling circuits for cooling the parts during engine operation. Example cooling circuits that include features such as airflow bleed ports are discussed below.

Figure 1B:
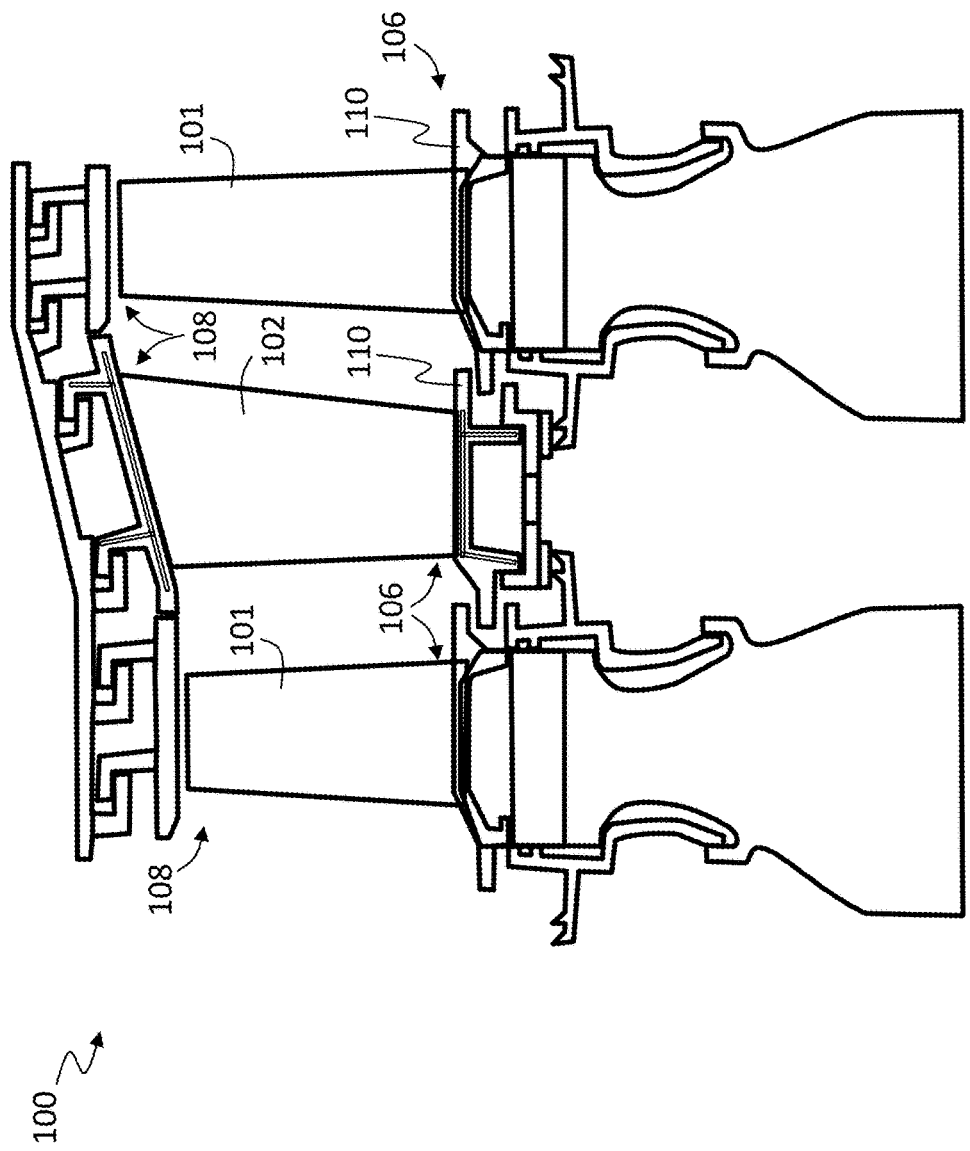
FIG. 1B is a schematic illustration of a turbine that may employ various embodiments disclosed herein.

FIG. 1B is a schematic view of a turbine section that may employ various embodiments disclosed herein. Turbine 100 includes a plurality of airfoils, including, for example, one or more blades 101 and vanes 102. The airfoils 101, 102 may be hollow bodies with internal cavities defining a number of channels or cavities, hereinafter airfoil cavities, formed therein and extending from an inner diameter 106 to an outer diameter 108, or vice-versa. The airfoil cavities may be separated by partitions within the airfoils 101, 102 that may extend either from the inner diameter 106 or the outer diameter 108 of the airfoil 101, 102. The partitions may extend for a portion of the length of the airfoil 101, 102, but may stop or end prior to forming a complete wall within the airfoil 101, 102. Thus, each of the airfoil cavities may be fluidly connected and form a fluid path within the respective airfoil 101, 102. The blades 101 and the vanes may include platforms 110 located proximal to the inner diameter thereof. Located below the platforms 110 may be airflow ports and/or bleed orifices that enable air to bleed from the internal cavities of the airfoils 101, 102. A root of the airfoil may connected to or be part of the platform 110.

Although an aero or aircraft engine application is shown and described above, those of skill in the art will appreciate that airfoil configurations as described herein may be applied to industrial applications and/or industrial gas turbine engines, land based or otherwise.

Figure 2B:
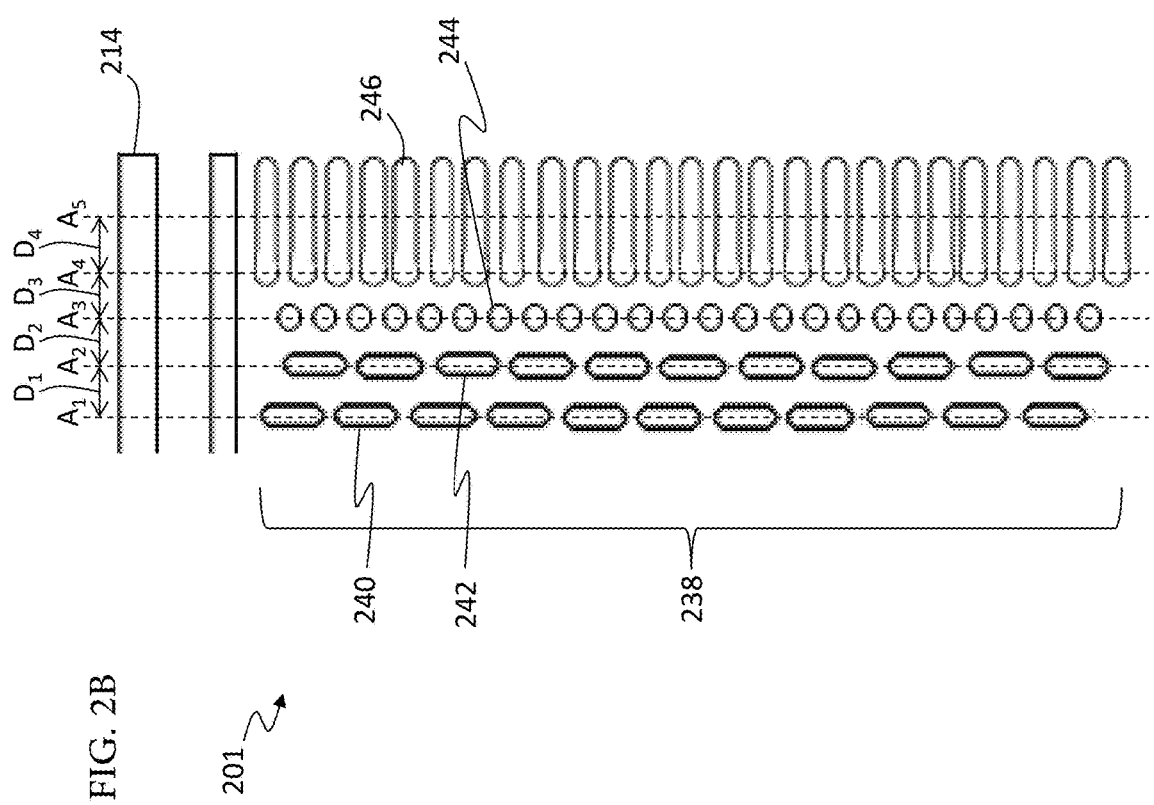
FIG. 2B is an enlarged schematic illustration of the airfoil of FIG. 2A showing structure and configuration of pedestals in accordance with an embodiment of the present disclosure.

Turning now to FIGS. 2A and 2B, views of an airfoil interior structure in accordance with a non-limiting embodiment of the present disclosure are shown. FIG. 2A is a cross-sectional schematic illustration of airflow passages within an airfoil 201, such as a blade, having flow path structures in accordance with an embodiment of the present disclosure. FIG. 2B is an enlarged schematic illustration of a trailing edge of the airfoil 201. Those of skill in the art will appreciate that airflow passages as described herein may be applied to any type of airfoil or other component, such as blades, vanes, blade outer air seals, etc.

As shown, an airfoil 201, such as a turbine blade in a gas turbine engine, may define an airfoil body 203 extending axially (with respect to an engine) from a leading edge 212 to a trailing edge 214. Further, the airfoil body may extend radially from a root 216 at an inner diameter 206 to a tip 218 at an outer diameter 208. The airfoil body 203 may define one or more cavities and/or flow paths therein that are configured to enable cooling of the airfoil 201.

A first flow path may be at the leading edge 212 of the airfoil and include a leading edge feed cavity 220. Air may enter the leading edge cavity 220 at one or more leading feed cavity apertures 222 that are formed in the root 216. The air may then flow from the root 216 toward the tip 218. As the air flows through the leading edge cavity 220 a portion of the air may flow into one or more impingement cavities 224 positioned along the leading edge 212 of the airfoil 201. The airflow path is shown by the arrows indicated in FIG. 2A. As shown, the leading edge cavity 220 is configured radially extending within the airfoil 201 from the inner diameter 206 to the outer diameter 208.

Air from the leading edge cavity 220 may then turn and enter a flag tip cavity 226. The flag tip cavity 226 may be an axially extending cooling air cavity configured at the tip 218 of the airfoil 201. The flag tip cavity 226 may extend axially along the tip 218 of the airfoil 201 from the leading edge 212 to the trailing edge 214, and have a flag tip exit 227 through which air may exit the airfoil 201. As will be appreciated by those of skill in the art, the dimensions shown in FIG. 2A may not be to scale and/or proportion, but are rather presented for explanatory purposes.

The airfoil 201 may also include one or more internal serpentine cavity 228. The serpentine cavity 228 may be configured to provide cooling to an interior or central portion of the airfoil 201 that is between the leading edge cavity 220 and a trailing edge cavity 230. The serpentine cavity 228 may have a serpentine-like structure that is configured to distribute air from one or more serpentine cavity apertures 232 through the serpentine cavity 228 as shown in FIG. 2A.

The trailing edge cavity 230 may be sourced through a trailing edge cavity aperture 234. The air within the trailing edge cavity 230 may flow out of the airfoil 201 through one or more exit ports 236, as shown in FIG. 2A.

As shown in the example embodiment of FIG. 2A, the trailing edge 214 is configured with a plurality of pedestals 238 in the trailing edge cavity 230. The pedestals 238, in various embodiments, are configured to supply a blockage to maintain feed pressure within the airfoil 201 (and particularly the trailing edge cavity 230), enable a backflow margin for cooling holes within the airfoil body 203, enable heat transfer augmentation on par with a refractory metal core of much smaller section thickness, and/or enable clocking of the pedestals 238 (e.g., second and third rows, as described below) to provide even distribution of flow between each stage of the pedestals 238 and out the trailing edge 214 of the airfoil 201 which may mitigate loss of stage efficiency from increase in flow as compared to a refractory metal core airfoil.

Turning now to FIG. 2B, an enlarged schematic illustration of the trailing edge 214 of the airfoil 201 is shown. In particular, as shown in FIG. 2B, a configuration of pedestals 238 in accordance with an embodiment of the present disclosure is shown. The pedestals 238, as shown, include a first set 240 of pedestals, a second set 242 of pedestals, a third set 244 of pedestals, and a fourth set 246 of pedestals. Each set 240, 242, 244, 246 includes a plurality of pedestals arranged radially within the airfoil 201. Further, the first set 240 may be a forward set, e.g., relative to a gas turbine engine in which airfoil 201 may be located. The second set 242 may thus be axially aftward from the first set 240, the third set 244 axially aftward from the second set 242, and the fourth set 246 axially aftward from the third set 244, with the fourth set 246 being closest or proximal to the trailing edge 214 of the airfoil 201.

Although shown and described with four (4) sets of pedestals, those of skill in the art will appreciate that any number of sets may be used to achieve a desired airflow and/or blockage of airflow within the airfoil, and thus FIGS. 2A and 2B are provided for illustrative and explanatory purposes and are not intended to be limiting. Further, as will be appreciated by those of skill in the art, the first and second sets 240, 242, due to the configuration and geometry thereof, may provide blocking of airflow in the axial direction, thus, the first and second sets (and similar sets of pedestals) may be referred to herein as blocking pedestals and/or blocking set of pedestals.

The first set 240, as shown in FIG. 2B, is aligned along a first pedestal axis $A_1$, the second set 242 is aligned along a second pedestal axis $A_2$, and the third set 244 is aligned along a third pedestal axis $A_3$. The fourth set 246 has two axes, due to the geometric shape of the pedestals that form the fourth set 245. Thus, a first end of the fourth set 246 is aligned along a fourth pedestal axis $A_4$, which passes through a first width portion of the pedestals of the fourth set 246. A second end of the fourth set 246 is aligned along a fifth pedestal axis $A_5$ that passes through a second width portion of each pedestal of the fourth set 246, as described below (see, e.g., FIG. 3B). As will be appreciated by those of skill in the art, each pedestal axis is a radially extending line in a direction form an inner diameter 206 to an outer diameter 208 of the airfoil 201 (e.g., as shown in FIG. 2A). As shown, each of the pedestal axes is parallel with the other pedestal axes, with each pedestal axis passing through a center of each pedestal of the respective set of pedestals (or center of a portion of a pedestal, i.e., with respect to the pedestals of the fourth set 246).

As shown in FIG. 2B, the first set 240 and the second set 242 of pedestals are formed of a group of radially extending racetrack pedestals. As defined herein, a racetrack pedestal is a pedestal having a constant width and having curved ends (see, e.g., FIG. 3A). The third set 244 of pedestals are formed of circular pedestals. The fourth set 246 of pedestals are formed of a plurality of axially extending spear pedestals. As defined herein, a spear pedestal is a pedestal having a first end having a first width and a second end having a second width, wherein the first width is great than the second width (see, e.g., FIG. 3B).

In accordance with embodiments of the present disclosure, the axes of the pedestal sets may be positioned to optimize the airflow and/or blockage (and other characteristics) of the pedestals. For example, the first pedestal axis $A_1$ may be axially spaced from the second pedestal axis $A_2$ by a first distance $D_1$. Further, a second distance $D_2$ axially separates the second pedestal axis $A_2$ from the third pedestal axis $A_3$. A third distance $D_3$ axially separates the third pedestal axis $A_3$ from the fourth pedestal axis $A_4$, and a fourth distance $D_4$ axially separates the fourth pedestal axis $A_4$ (e.g., the first end of the fourth set 246 of pedestals) and the fifth pedestal axis $A_5$ (e.g., the second end of the fourth set 246 of pedestals).

In some non-limiting examples, the first distance $D_1$ is between about 0.025 inches and about 0.100 inches (about 0.064-0.254 cm), the second distance $D_2$ is between about 0.025 inches and about 0.100 inches (about 0.064-0.254 cm), the third distance $D_3$ is between about 0.025 inches and about 0.100 inches (about 0.064-0.254 cm), and the fourth distance $D_4$ is between about 0.025 inches and about 0.100 inches (about 0.064-0.254 cm). Those of skill in the art will appreciate that various other distances and/or relative distances may be used without departing from the scope of the present disclosure. Further, the spacing between each pair of axes may be relative to the distance between other pairs. For example, the distance between each pair of adjacent pedestal axes is within 5-20% of the other distances between each pair of adjacent pedestal axes. That is, the spacing for each pedestal axis in the axial direction (e.g., with respect to a gas turbine engine) may have a variance of 5-20%.

As noted above, the first and second sets 240, 242 of the pedestals is composed of racetrack pedestals, the third set 244 is composed of circular pedestals, and the fourth set 246 is composed of spear pedestals. Accordingly, the various pedestals may provide differing amounts of blockage to airflow through the airfoil 201. For example, the first and second sets 240, 242 of the pedestals, in one non-limiting embodiment, provide a blockage of 65-80% and the third and fourth sets 244, 246 provides a blockage of 45-60%.

Furthermore, the number of pedestals in each set may be configured to define a desired airflow and/or blockage of airflow within the trailing edge 214 of the airfoil 201. In one non-limiting example, the first and second sets 240, 242 of pedestals include twelve (12) pedestals each extending radially within the airfoil 201. The second set 244 of pedestals includes twenty-four (24) pedestals, and the third set 246 of pedestals includes twenty-five (25) pedestals. In each set 240, 242, 244, 246, the pedestals may have equal spacing from adjacent pedestals in the radial direction.

Figure 3B:
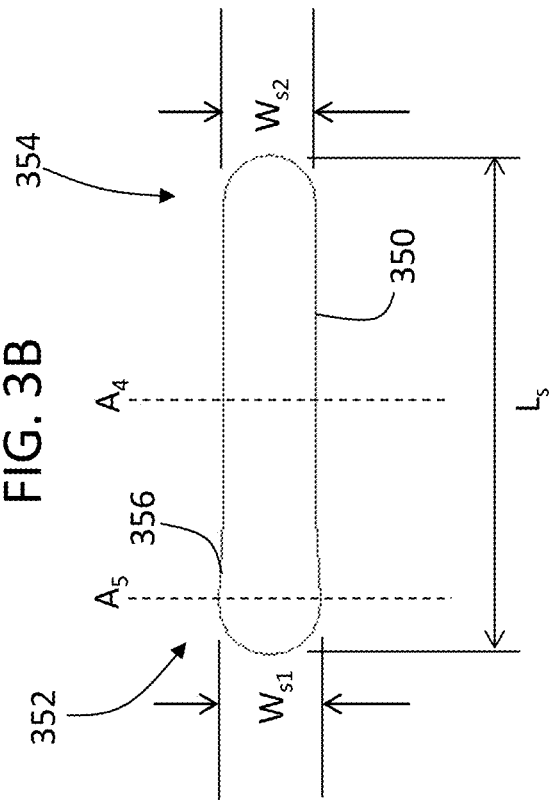
FIG. 3B is a schematic illustration of the geometry of a spear pedestal in accordance with an embodiment of the present disclosure.
Figure 3A:
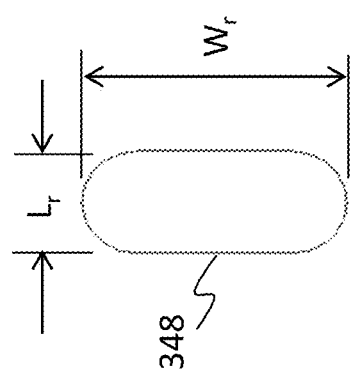
FIG. 3A is a schematic illustration of the geometry of a racetrack pedestal in accordance with an embodiment of the present disclosure.

Turning now to FIGS. 3A and 3B, schematic illustrations of a racetrack pedestal 348 and a spear pedestal 350 are show. The racetrack pedestals 348 may form the structure of the pedestals of the first and second pedestal sets (e.g., first and second sets 240, 242 in FIGS. 2A, 2B). The spear pedestals 350 may form the structure of the pedestals of the fourth pedestal set (e.g., fourth set 246 in FIGS. 2A, 2B). As shown and described herein, the pedestals 348, 350 have a width in an axial direction (relative to an axis of an engine) and a length in a radial direction (relative to the axis of an engine) (see, e.g., FIGS. 2A, 2B).

Referring to FIG. 3A, the racetrack pedestal 348 may be configured with a width $W_r$ and a length $L_r$, and have rounded ends along the width $W_r$. The width $W_r$ of the racetrack pedestal 348 is larger than the length $L_r$ of the racetrack pedestal 348. The width $W_r$ enables the racetrack pedestal 348 to provide blockage within an airfoil flow path and enables a backflow margin for cooling holes within the airfoil. In a non-limiting embodiment, the length $L_r$ of the racetrack pedestal 348 is between about 0.036 inches and about 0.144 inches (about 0.091-0.366 cm) and the width $W_r$ of the racetrack pedestal 348 is between about 0.013 inches and about 0.050 inches (about 0.033-0.127 cm). Further, in some embodiments, the racetrack pedestals may have a width to length ratio of between 0.75 and 0.90, thus the ratio may be between $$\frac{W_r}{L_r} = 0.75 \text{ and } \frac{W_r}{L_r} = 0.90.$$

Referring to FIG. 3B, the spear pedestal 350 may have a first end 352 and a second end 354, the spear pedestal 350 having a length $L_s$. At the first end 352 is a blockage feature 356. As shown, the blockage feature 356 of the spear pedestal 350 may form less than half the length $L_s$. The blockage feature 356 at the first end 352 of the spear pedestal 350 has a first width $W_{s1}$ and at the second end 354 the spear pedestal 350 has a second width $W_{s2}$. Further, the spear pedestal 350 has rounded ends at the first and second ends 352, 354, as shown.

In some embodiments, such as shown in FIG. 3B, the first width $W_{s1}$ at the first end 352 is larger than the second width $W_{s2}$ at the second end 354. Further, the length $L_s$ of the spear pedestal 350 is larger than either of the first and second widths $W_{s1}$, $W_{s2}$ of the spear pedestal 350. In a non-limiting embodiment, the first width $W_{s1}$ of the spear pedestal 350 is between about 0.013 inches and about 0.052 inches (about 0.033-0.132 cm), the second width $W_{s2}$ of the spear pedestal 350 is between about 0.011 inches and about 0.045 inches (about 0.028-0.114 cm), and the length $L_s$ of the spear pedestal 350 is between 0.050 inches and 0.200 inches (0.127-0.508 cm). Further, in some embodiments, the spear pedestals may have a first width $W_{s1}$ to second width $W_{s2}$ ratio of between 1.1 and 1.2, thus the ratio may be between $$\frac{W_{s1}}{W_{s2}} = 1.1 \text{ and } \frac{W_{s1}}{W_{s2}} = 1.2.$$

The circular pedestals of the airfoil may have a diameter of between about 0.013 inches and about 0.050 inches (about 0.033-0.127 cm) (see, e.g., third set 244 of pedestals in FIGS. 2A, 2B). As will be apparent to those of skill in the art, in some embodiments, the diameter of the circular pedestals may be equal to the length of the racetrack pedestals.

Turning to FIG. 4, as will be appreciated by those of skill in the art, various configurations, geometries, sizes, shapes, etc. of the pedestals may be used without departing from the scope of the present disclosure. For example, rounded pedestals having flat faces (e.g., pedestals 458a, 458b) may be employed. Further, for example, triangular pedestal (e.g., pedestals 458c, 458d) may be employed. As apparent from FIG. 4, the various pedestals may have faces that face either forward or aftward. Moreover, other geometries are contemplated, including, but not limited to, diamond, rectangular, square, etc. Moreover, similar geometries may be used to form the blockage feature of the spear pedestals and/or may replace the circular pedestals.

As will be appreciated by those of skill in the art, the above described features can be manufactured through the use of investment casting and/or use of cores (e.g., refractory metal cores). Accordingly, although described above as features of an airfoil, the inverse features can be provided in a core that is used to manufacture the airfoil. That is, in some embodiments of the present disclosure, a core may be formed having voids, apertures, or other structure(s) that are used to enable the formation and manufacture of an airfoil having the features shown in FIGS. 2A-4 and described above. As such, in some embodiments, a core having one or more apertures in the shape and dimensions of the above described pedestals is provided to form an airfoil as shown and described above.

Figure 5:
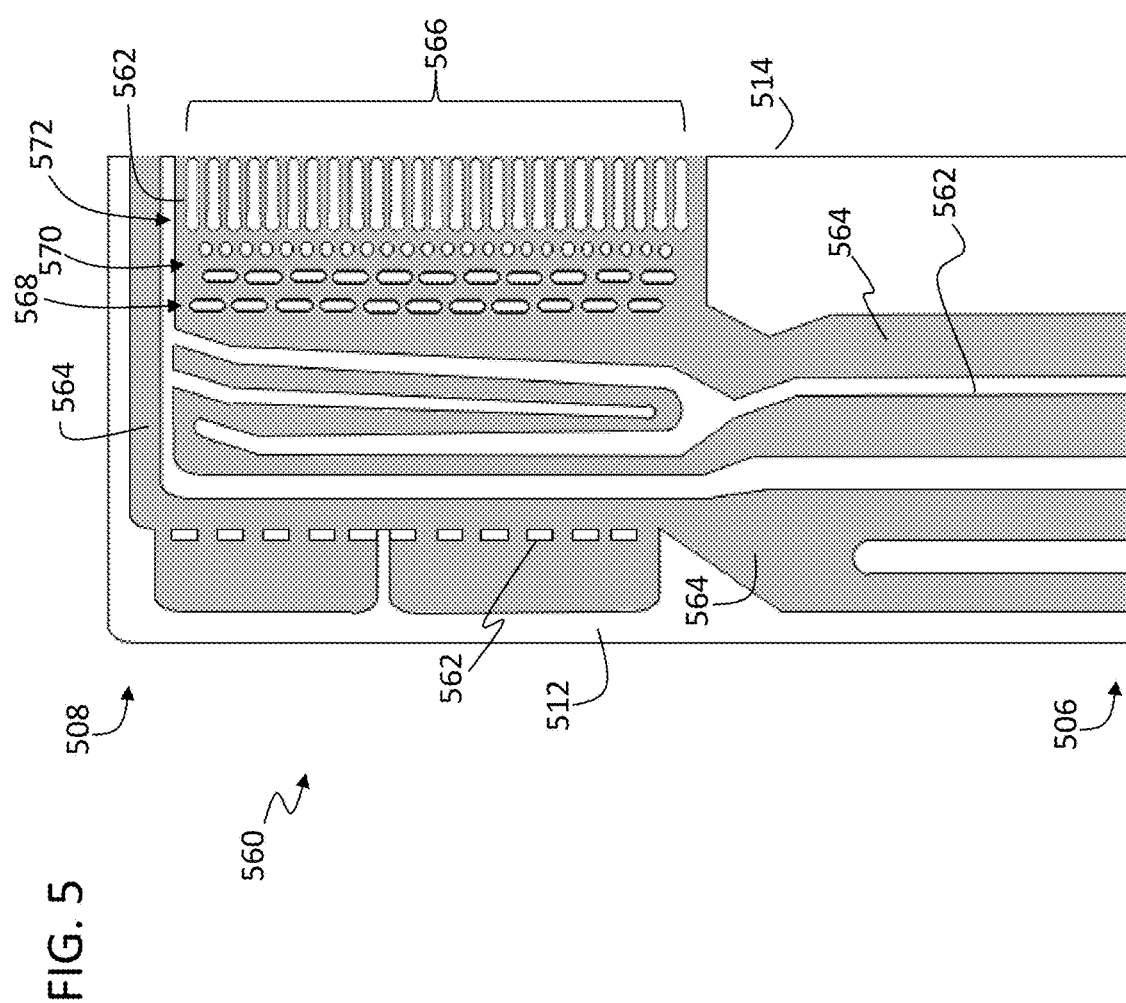
FIG. 5 is a schematic illustration of a core in accordance with the present disclosure that is used to manufacture an airfoil as provided herein.

For example, turning to FIG. 5, a cross-sectional schematic illustration of a core in accordance with the present disclosure is shown. The core 560 is an inverse structure of the airfoil 201 of FIG. 2A. As such, the core 560 includes voids and/or apertures 562 that are within a core body 564. Further, as shown, a plurality of apertures or voids 562 are shaped and positioned proximate to a trailing edge 514 of the core body 564 (and thus a trailing edge of an airfoil formed using the core body 564). The apertures and/or voids 562 at the trailing edge 514 are referred to herein as a trailing edge structure 566.

That is, as shown in FIG. 5, a core 560 for manufacturing an airfoil of a gas turbine engine is shown. The core 560 has a core body 564 a plurality of apertures and voids 562 therein configured to enable manufacture of an airfoil. When used to form an airfoil, the core body 560 has a leading edge 512 and a trailing edge 514 extending in a radial direction from an inner diameter 506 to an outer diameter 508.

The trailing edge structure 566 is proximate to the trailing edge 514 of the core body 560. The trailing edge structure 566 is configured to form a trailing edge cavity in an airfoil (as shown and described above). The trailing edge structure 566 extends from the trailing edge 514 in a forward direction toward the leading edge 512. As shown, the trailing edge structure 566 includes at least one first set of apertures 568 is configured to form at least one set of blocking pedestals located within the trailing edge structure 566. At least one second set of apertures 570 is configured to form a set of circular pedestals located aftward from the first set of apertures 568. At least one third set of apertures 572 is configured to form a set of spear pedestals located aftward from the set of circular pedestals and closest to the trailing edge 514 of the core body 564.

Figure 6:
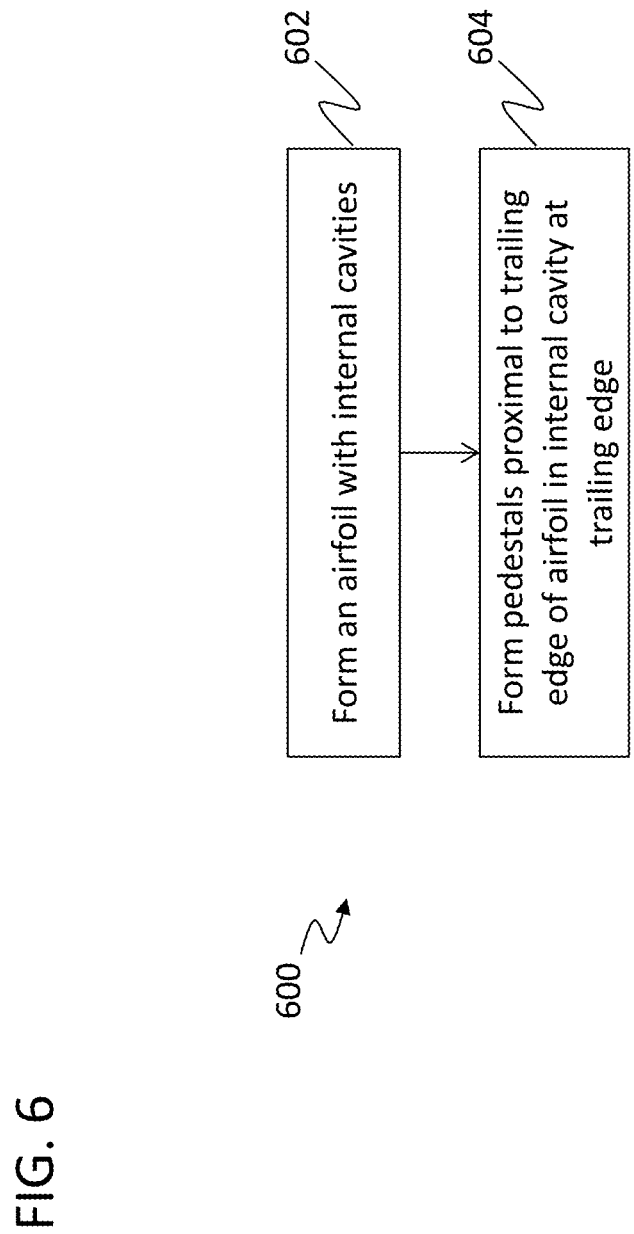
FIG. 6 is a flow process of forming an airfoil for a gas turbine engine in accordance with an embodiment of the present disclosure.

Turning now to FIG. 6, a flow process 600 for manufacturing an airfoil in accordance with a non-limiting embodiment of the present disclosure is shown. At block 602, an airfoil is formed with internal cavities, including, for example, a leading edge cavity, a flag tip cavity, a serpentine cavity, and a trailing edge cavity, as described above. At block 604, a plurality of pedestals are formed within the trailing edge cavity of the airfoil. The pedestals may be formed in a number of sets, with each set extending radially within the airfoil, such as shown and described above (see, e.g., FIGS. 2A, 2B). As will be appreciated by those of skill in the art, the steps of the flow process 600 may be performed simultaneously and/or nearly simultaneously, or as separate discrete steps. For example, blocks 602 and 604 may be performed simultaneously in a casting, molding, or additive manufacturing process.

The airfoils as provided herein, having pedestals and other trailing edge features, can be made with or from refractory metal cores. Further, investment casting may be used as known in the art.

Advantageously, embodiments described herein provide an airfoil having a plurality of pedestal sets that provide airflow control at a trailing edge of the airfoil. For example, the pedestal sets may provide blockage to maintain feed pressure and backflow margin for cooling holes within the airfoil. Further, the pedestal sets may provide heat transfer augmentation on par with refractory metal cores of much smaller section thickness. Further, clocking of the pedestals (e.g., second and third rows) may be carried out to provide even distribution of flow between each stage of the pedestals and an airflow out the trailing edge of the airfoil. Advantageously, this may mitigate loss of stage efficiency from increase in flow as compared to a refractory metal core. Furthermore, advantageously, embodiments as provided herein may enhance ceramic core and casting producibility by providing maximum blockage without sacrificing cross-sectional area between pedestals and/or pedestal sets.

The use of the terms "a," "an," "the," and similar references in the context of description (especially in the context of the following claims) are to be construed to cover both the singular and the plural, unless otherwise indicated herein or specifically contradicted by context. The modifier "about" used in connection with a quantity is inclusive of the stated value and has the meaning dictated by the context (e.g., it includes the degree of error associated with measurement of the particular quantity). All ranges disclosed herein are inclusive of the endpoints, and the endpoints are independently combinable with each other.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments.

For example, although shown and described herein with respect to vanes and blades, those of skill in the art will appreciate that any type of airfoil or component requiring flow passages, bleed ports, and/or cooling may employ embodiments described herein. For example, although described with respect to airfoils of gas turbine engines, those of skill in the art will appreciate that the airfoils are not limited to gas turbine engines, and embodiments described herein may be applied to any type of airfoil that has internal cooling passages. Further, although described and shown with various example geometries and configurations, those of skill in the art will appreciate that variations on the disclosed shapes, geometries, etc. may be made without departing from the scope of the present disclosure. Moreover, although an aero or aircraft engine application is shown and described above, those of skill in the art will appreciate that airfoil configurations as described herein may be applied to industrial applications and/or industrial gas turbine engines, land based or otherwise.

Accordingly, the present disclosure is not to be seen as limited by the foregoing description, but is only limited by the scope of the appended claims.

What is claimed is:

1. An airfoil of a gas turbine engine comprising:
   an airfoil body having a leading edge and a trailing edge extending in a radial direction;
   a trailing edge cavity formed within the airfoil and proximate to the trailing edge of the airfoil, the trailing edge cavity extending from the trailing edge in a forward direction toward the leading edge;
   at least one set of blocking pedestals located within the trailing edge cavity, wherein each blocking pedestal of the set of blocking pedestals has a length (Lr) extending in an axial direction and a width (Wr) in the radial direction, wherein the width is greater than the length, thus forming a racetrack geometry such that each pedestal has a constant width and has curved ends;
   a set of circular pedestals located aftward from the at least one blocking set of pedestals; and
   a set of spear pedestals located aftward from the set of circular pedestals and closest to the trailing edge of the airfoil body,
   wherein the blocking pedestals, the circular pedestals, and the spear pedestals are integrally clocked with an adjacent set of pedestals to provide even distribution of flow between each set of the pedestals and out the trailing edge of the airfoil,
   wherein the blocking pedestals block a flow path of air through the trailing edge cavity and generate a feed pressure and backflow margin for cooling holes within the airfoil.

2. The airfoil of claim 1, wherein the at least one set of blocking pedestals comprises two sets of blocking pedestals.

3. The airfoil of claim 2, wherein a spacing between a first set of blocking pedestals and a second set of blocking pedestals is between 0.025 inches and 0.100 inches (0.064-0.254 cm) and a space between the second set of blocking pedestals and the set of circular pedestals is between 0.025 inches and 0.100 inches (0.064-0.254 cm).

4. The airfoil of claim 1, wherein each of the at least one set of blocking pedestals, the set of circular pedestals, and the set of spear pedestals are arranged along a respective pedestal axis extending in a radial direction, wherein each of the respective pedestal axes of the blocking pedestals, the circular pedestals, and the spear pedestals is parallel with the other respective pedestal axes of the blocking pedestals, the circular pedestals, and the spear pedestals.

5. The airfoil of claim 1, wherein a width to length ratio for the pedestals of the at least one set of blocking pedestals is between 0.75 and 0.90.

6. The airfoil of claim 1, wherein the length of each pedestal of the at least one set of blocking pedestals is between 0.036 inches and 0.144 inches (0.091-0.366 cm) and the width of each pedestal of the at least one set of blocking pedestals is between 0.013 inches and 0.050 inches (0.033-0.127 cm).

7. The gas turbine engine of claim 1, wherein the at least one set of blocking pedestals blocks between 65% and 80% of flow through the trailing edge cavity and the set of circular pedestals and spear pedestals block between 45% and 60% of flow through the trailing edge cavity.

8. A gas turbine engine comprising:
   an airfoil having:
   an airfoil body having a leading edge and a trailing edge extending in a radial direction;
   a trailing edge cavity formed within the airfoil and proximate to the trailing edge of the airfoil, the trailing edge cavity extending from the trailing edge in a forward direction toward the leading edge;
   at least one set of blocking pedestals located within the trailing edge cavity, wherein each blocking pedestal of the set of blocking pedestals has a length (Lr) extending in an axial direction and a width (Wr) in the radial direction, wherein the width is greater than the length, thus forming a racetrack geometry such that each pedestal has a constant width and has curved ends;
   a set of circular pedestals located aftward from the at least one blocking set of pedestals; and
   a set of spear pedestals located aftward from the set of circular pedestals and closest to the trailing edge of the airfoil body,
   wherein the blocking pedestals, the circular pedestals, and the spear pedestals are integrally clocked with an adjacent set of pedestals to provide even distribution of flow between each set of the pedestals and out the trailing edge of the airfoil,
   wherein the blocking pedestals block a flow path of air through the trailing edge cavity and generate a feed pressure and backflow margin for cooling holes within the airfoil.

9. The gas turbine engine of claim 8, wherein the at least one set of blocking pedestals comprises two sets of blocking pedestals.

10. The gas turbine engine of claim 9, wherein a spacing between a first set of blocking pedestals and a second set of blocking pedestals is between 0.025 inches and 0.100 inches (0.064-0.254 cm) and a space between the second set of blocking pedestals and the set of circular pedestals is between 0.025 inches and 0.100 inches (0.064-0.254 cm).

11. The gas turbine engine of claim 8, wherein each of the at least one set of blocking pedestals, the set of circular pedestals, and the set of spear pedestals are arranged along a respective pedestal axis extending in a radial direction, wherein each of the respective pedestal axes of the blocking pedestals, the circular pedestals, and the spear pedestals is parallel with the other respective pedestal axes of the blocking pedestals, the circular pedestals, and the spear pedestals.

12. The gas turbine engine of claim 8, wherein a width to length ratio for the pedestals of the at least one set of blocking pedestals is between 0.75 and 0.90.

13. The gas turbine engine of claim 8, wherein the length of each pedestal of the at least one set of blocking pedestals is between 0.036 inches and 0.144 inches (0.091-0.366 cm) and the width of each pedestal of the at least one set of blocking pedestals is between 0.013 inches and 0.050 inches (0.033-0.127 cm).

14. The airfoil of claim 8, wherein the at least one set of blocking pedestals blocks between 65% and 80% of flow through the trailing edge cavity and the set of circular pedestals and spear pedestals block between 45% and 60% of flow through the trailing edge cavity.

15. A core for manufacturing an airfoil of a gas turbine engine, the core comprising:
   a core body having core body and a plurality of apertures and voids therein configured to enable manufacture of an airfoil, the core body having a leading edge and a trailing edge extending in a radial direction; and
   a trailing edge structure proximate to the trailing edge of the core body, the trailing edge structure configured to form a trailing edge cavity in an airfoil, the trailing edge structure extending from the trailing edge in a forward direction toward the leading edge, the trailing edge structure comprising:

at least one first set of apertures configured to form at least one set of blocking pedestals located within the trailing edge cavity, wherein each blocking pedestal of the set of blocking pedestals has a length (Lr) extending in an axial direction and a width (Wr) in the radial direction, wherein the width is greater than the length, thus forming a racetrack geometry such that each pedestal has a constant width and has curved ends;

at least one second set of apertures configured to form a set of circular pedestals located aftward from the at least one blocking set of pedestals; and at least one third set of apertures configured to form a set of spear pedestals located aftward from the set of circular pedestals and closest to the trailing edge of the airfoil body, wherein the blocking pedestals, the circular pedestals, and the spear pedestals are integrally clocked with an adjacent set of pedestals to provide even distribution of flow between each set of the pedestals and out the trailing edge of the airfoil, wherein the blocking pedestals block a flow path of air through the trailing edge cavity and generate a feed pressure and backflow margin for cooling holes within the airfoil.

16. The core of claim 15, wherein the core body is a refractory metal core.

17. The core of claim 15, wherein the first set of apertures includes apertures for two sets of blocking pedestals.

18. The core of claim 15, wherein each of the first set of apertures, the second set of apertures, and the third set of apertures are arranged along a respective pedestal axis extending in a radial direction, wherein each pedestal axis is parallel with the other pedestal axes.

19. The core of claim 15, wherein the at least one set of blocking pedestals is configured to block between 65% and 80% of flow through the formed trailing edge cavity and the set of circular pedestals and spear pedestals are configured to block between 45% and 60% of flow through the formed trailing edge cavity.

* * * * *